(12) United States Patent
Wang et al.

(10) Patent No.: US 8,164,788 B2
(45) Date of Patent: Apr. 24, 2012

(54) CLUSTER-BASED PRINTER MODEL FOR TONE REPRODUCTION CURVE ESTIMATION

(75) Inventors: Shen-Ge Wang, Fairport, NY (US); David C. Craig, Pittsford, NY (US); Fan Shi, Penfield, NY (US)

(73) Assignee: Xerox Corporation, Norwalk, CT (US)

( * ) Notice: Subject to any disclaimer, the term of this patent is extended or adjusted under 35 U.S.C. 154(b) by 924 days.

(21) Appl. No.: 12/190,695

(22) Filed: Aug. 13, 2008

(65) Prior Publication Data
US 2010/0039657 A1    Feb. 18, 2010

(51) Int. Cl.
G06F 15/00    (2006.01)
G06K 1/00    (2006.01)

(52) U.S. Cl. ........... 358/1.9; 358/1.1; 358/1.4; 358/504; 358/1.14; 358/1.15; 358/3.01; 358/3.06; 358/3.07; 358/3.2; 358/501; 358/518; 358/519; 382/162; 382/167

(58) Field of Classification Search ............ 358/1.9, 358/1.1, 1.4, 504, 1.14, 1.15, 3.01, 3.06–3.07, 358/3.2, 501, 518–519; 382/162, 167
See application file for complete search history.

(56) References Cited

U.S. PATENT DOCUMENTS

| 6,250,733 | B1 | 6/2001 | Yao et al. | |
| 6,775,029 | B1 * | 8/2004 | Wen et al. | 358/1.9 |
| 2006/0152764 | A1 * | 7/2006 | Loce et al. | 358/3.06 |

OTHER PUBLICATIONS

Sharma, G., *Digital Color Imaging Handbook*, CRC Press, 2002, ISBN 0-8493-0900-X.
Yule, et al., *Principles of Color Reproduction*, GATF Press, $2^{nd}$ Rev. Ed. (2001), ISBN 0-88362-222-X.
Wang, et al., "Nonorthogonal Halftone Screens," *International Conference on Digital Printing Technologies*, 2002, pp. 578-584.

* cited by examiner

*Primary Examiner* — David K Moore
*Assistant Examiner* — Quang N Vo
(74) *Attorney, Agent, or Firm* — Philip E. Blair; Fleit Gibbons Gutman Bongini & Bianco P.L.

(57) ABSTRACT

What is disclosed is a system and method for efficiently and accurately estimating the complete TRC for a color marking device equipped with a multi-center cluster halftone screen which has a similar halftone tiling geometry and a similar growth specified by a corresponding single-center cluster halftone screen. The present method introduces a cluster-based printer model which establishes a relationship between a color output of a single-center cluster halftone screen and a color output of a multi-center cluster halftone screen. The present cluster-based printer model determines the complete TRC for the multi-center cluster halftone screen using the measurements for the single-center cluster halftone screen. Results of halftone dot linearization with different printing devices demonstrates that high accuracy can be achieved using the reduced measurements from the single-center cluster halftone screen. The present method finds its uses in characterization processes for a wide variety of color marking devices known in the arts.

12 Claims, 4 Drawing Sheets

CLUSTER-BASED PRINTER MODEL FOR TONE REPRODUCTION CURVE ESTIMATION

TECHNICAL FIELD

The present invention is directed to systems and methods for generating a tone reproduction curve used to characterize a color marking device equipped with a multi-center cluster halftone screen.

BACKGROUND

In digital imaging systems, color management is the controlled conversion between the color representations of various devices, such as image scanners, digital cameras, monitors, TV screens, film printers, computer printers, offset presses, and corresponding media. One goal of color management is to obtain a good match across color devices; for example, a video which should appear the same color on a computer LCD monitor, a plasma TV screen, and on a printed frame of video. Color management helps to achieve the same appearance on all of these devices, provided the devices are capable of delivering the needed color intensities. Color imaging technology has become almost ubiquitous in modern life. For a more comprehensive introduction into the many facets of color imaging, see: *Digital Color Imaging Handbook*, by: Gaurav Sharma (Ed.), CRC Press (December 2002), ISBN-13: 978-0-8493-09007, which is incorporated herein in its entirety by reference.

One key issue in color imaging is how to deal with a color that cannot be reproduced on a certain device in order to show it through a different device as if it were visually the same color, just as when the reproducible color range between color transparencies and printed matters are different. There is no common method for this process, and the performance depends on the capability of each color matching method. Digital halftoning is a process in which digital input signals to a binary digital printer are modified prior to outputting an image such that the printed image creates the illusion of the continuous tone (contone) of the original color image. Much effort in the field of digital halftoning is directed to developing sophisticated algorithms used to best match specific color parameters of an output device to input colors such that the source image is accurately reproduced on the output device. For a more comprehensive introduction to halftones, see: Chapter 6—Digital Color Halftones, in the above-referenced *Digital Color Imaging Handbook*.

One halftone method is referred to as screening. Halftone screening compares requested contone levels to predetermined threshold levels typically defined over a rectangular cell that is tiled to fill the image plane. If the contone level at a spot is greater than the threshold level, a spot is printed; otherwise, a spot is not printed. The output of the screening process is a binary pattern of multiple small dots which are regularly spaced as determined by the addressability of the imaging system. Marking processes such as electro-photography and offset printing typically cluster the small dots within a cell because a large clustered mass prints with more consistent size and density than small spots printed with individual isolated pixels. The alignment of the clusters via the halftone-cell tiling defines the geometry of the halftone screen. The resulting halftone structure is a two-dimensionally repeated pattern, possessing two fundamental spatial frequencies determined by the geometry of the halftone screen.

A cluster based halftone screen contains only a single center or multiple centers which have similar geometries. For many digital halftone printers, the use of single-center halftone screens is limited because of the relatively fewer number of levels. A single cell usually does not contain a large number of pixels. Therefore, it cannot provide enough simulated contone levels as desired by many sophisticated color reproduction tasks. A common approach to overcome this problem is employing halftone screens with multiple centers (M), such as dual-dots (M=2), quad-dots (M=4), and stoclustic screens (M as large as a few hundred).

One important performance measure of a printing device is the tone reproduction curve, often referred to as the TRC. The TRC defines the color output given a specified color input. The tone reproduction curve can be determined by measurement using, for example, a calorimeter. For all possible binary patterns produced by a halftone process with a halftone screen and spatially constant inputs, the outputs of printed test patches are measured and the color differences between the printed patches and the paper can be calculated from the measurements and plotted against the input levels as the desired TRC. For devices with single-cell cluster screens, it is a practical approach to obtain the complete TRCs since the number of measurements required to be obtained is relatively small. Since multi-center cluster screens provide many more distinguishable levels to enable high-quality color output, such an approach becomes no longer practical to accurately measure the raw data necessary to generate the TRC for device's with multi-center halftone screens. Unlike for single-center screens, it can be difficult and time consuming to print and measure hundreds (or perhaps thousands) of halftone patterns for all possible input levels. Usually this problem is solved by empirical approaches using sampled measurements and mathematic functions to determining the TRCs. One such approach for algorithmically determining TRCs is based on the Yule-Nielsen modified spectral Neugebauer model (YNN). For a more thorough discussion of the YNN model, see: *Principles of Color Reproduction*, by: John Yule, Gary Field, Graphic Arts Technical Foundation Press, $2^{nd}$ Rev. Ed. (2001), ISBN-13: 978-0-8836-22223.

For a given halftone pattern containing a single colorant, the YNN model is given by:

$$R^{1/\gamma}(\lambda) = (1-a)R_p^{1/\gamma}(\lambda) + aR_c^{1/\gamma}(\lambda) \qquad (1)$$

where $R(\lambda)$ is the estimated average spectral reflectance of the halftone pattern at wavelength $(\lambda)$, a is the fractional area covered by the toner or ink, and $R_p(\lambda)$ and $R_c(\lambda)$ are the measured spectral reflectances of the paper (a=0%) and solid toner (a=100%), respectively. The fitting parameter $\gamma$ depends on the amount of light diffusion in the paper and typically is between a value of 1 and 10. Once the reflectance spectra of the paper and the solid toner have been measured, the reflectance spectrum of the halftone pattern can be calculated with an estimated toner coverage of the fractional coverage area. The coverage area can be determined directly from the digital binary halftone pattern. The YNN model has been shown to provide reasonable predictions. Model-based approaches tend to be more efficient. However, the accuracy of a model's prediction can be limited due to the difficulty of estimating the true toner coverage of a particular halftone pattern because the actual outputs from different printers can be complicated and because adjacent printed pixels tend to overlap. Further, physical halftone outputs have irregular shapes and their size, shape and density can vary with time and location. The scattering of light in the paper substrate adds further complexity thereby making a detailed microscopic model of the dot overlapping difficult to construct. Even with a well defined digital binary description, the true area covered by toner of a halftone pattern can be difficult to accurately measure. Another drawback is that such model-based methods tend to yield relatively large errors in the derived TRCs. Such errors may cause artifacts to arise in the color outputs of devices which have been characterized using such derived TRCs.

Accordingly, what is needed in this art is a new method for tone reproduction curve estimation for devices equipped with multi-center cluster halftone screens which combines the accuracy of measurement-based approaches with the efficiency of model-based approaches.

BRIEF SUMMARY

What is provided are a system, method, and computer program product for efficiently and accurately estimating the complete TRC for a color marking device equipped with a multi-center cluster halftone screen which has a similar halftone tiling geometry and a similar growth specified by a corresponding single-center cluster halftone screen. The present method introduces a cluster-based printer model which establishes a relationship between a color output of a single-center cluster halftone screen and a color output of a multi-center cluster halftone screen. The present cluster-based printer model determines the complete TRC for the multi-center cluster halftone screen using the fewer measurements for the single-center cluster halftone screen. Results of halftone dot linearization with different printing devices demonstrates that high accuracy can be achieved using the reduced measurements from the single-center cluster halftone screen. Discontinuities in the TRCs of the halftone outputs can be more accurately captured. The present method readily finds its uses in device calibration and characterization processes used for a variety of color marking devices with multi-center halftone screens known in the arts.

In one example embodiment, test patches are printed for each of a total of N levels using the corresponding single-center cluster halftone screen with the target color marking device. Color measurements are obtained for each of the printed patches. A cluster-based printer model which establishes a relationship between a color output of a single-center cluster halftone screen and a color output of a multi-center cluster halftone screen is defined for the target marking device. A definition for the present cluster-based printer model is discussed in detail herein further. Color values for the multi-center cluster halftone screen are calculated using the cluster-based printer model and the color measurements. CIE ΔE values are calculated from the color values for the multi-center cluster halftone screen and plotted. The plotted values produce a complete tone reproduction curve for the multi-center cluster halftone screen. The target marking device can then be characterized using the produced complete tone reproduction curve.

The foregoing and other features and advantages will be apparent from the following more particular description of the embodiments of the invention, as illustrated in the accompanying drawings.

BRIEF DESCRIPTION OF THE DRAWINGS

The foregoing and other features and advantages of the subject matter disclosed herein will be made apparent from the following detailed description taken in conjunction with the accompanying drawings, in which.

DETAILED DESCRIPTION

Figure 1:
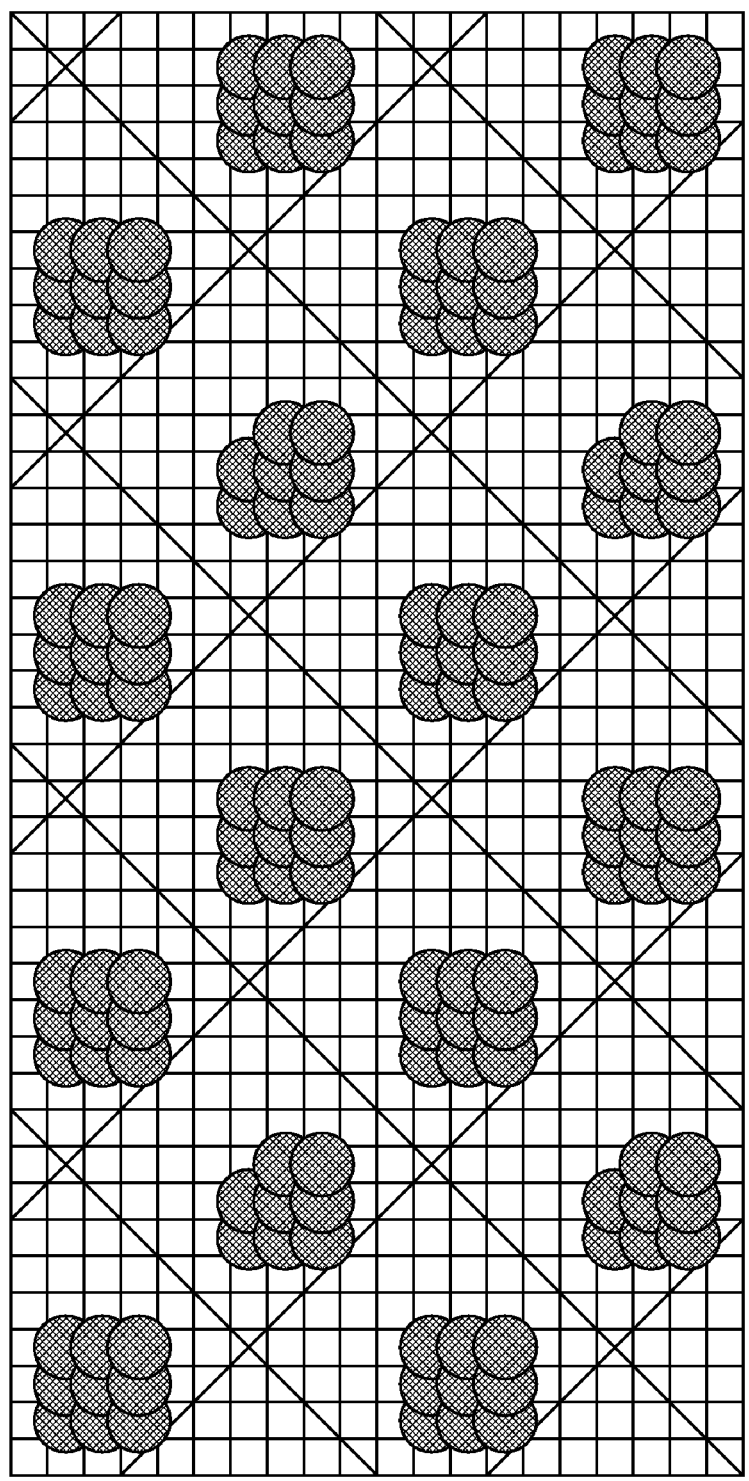
FIG. 1 illustrates a halftone pattern with two different clusters blended as an output of a multi-center (M=4) halftone screen.

What is provided are a system and method for efficiently and accurately estimating the complete TRC for a color marking device equipped with a multi-center cluster halftone screen which has a similar halftone tiling geometry and a similar growth specified by a corresponding single-center cluster halftone screen. The present method introduces a cluster-based printer model which establishes a relationship between a color output of a single-center cluster halftone screen and a color output of a multi-center cluster halftone screen. As will be described more fully herein, the present cluster-based printer model accurately estimates the complete TRC for a multi-center cluster halftone screen using the measurements from a corresponding single-center cluster halftone screen.

It should be understood that one skilled in this art would be readily familiar with many facets of color science such as, but not limited to, tone reproduction curve generation, color measurement and measuring devices, halftone processes, device characterization and calibration, and other algorithms and techniques common to this particular field of art. Additionally, one would also be readily familiar with mathematical techniques used in various color transformation algorithms and processes in the color science arts. One of ordinary skill would be knowledgeable about computer software and programming systems and methods sufficient to implement the functionality and capabilities described in detail herein in their own color management system environments without undue experimentation.

As used herein, CIE L*a*b* (CIELAB) is a complete color space specified by the International Commission on Illumination (Commission Internationale d'Eclairage). The color space describes all colors visible to the human eye and was created to serve as a device independent model to serve as a color reference. The L*a*b* color space is based on non-linearly compressed CIE XYZ color space coordinates. The three coordinates of CIELAB (L*,a*,b*) represent the lightness of the color (L*, L*=0 yields black and L*=100 indicates diffuse white; specular white may be higher), a* represents a position between red/magenta and green (negative values of a* indicate green while positive values indicate magenta), and b* represents its position between yellow and blue (negative values of b* indicate blue and positive values indicate yellow). The ICC has also defined an open standard for a Color Matching Module (CMM) at the operating system (OS) level, and color profiles for devices and color working spaces (color spaces a user edits in).

A "color marking device" refers to a color output device capable of rendering text, graphics, images, plots, graphs, and the like, for visual examination. Such output devices include production printers, xerographic devices, image reproduction equipment, color monitors, displays, and any device capable of outputting a color signal. To render a color image is to output the color image to a color output device. Color image output devices receive a color image signal and reduce the color signal to viewable form. Example color image output devices capable of image reduction include printers, copiers, monitors, projectors, and the like. Image reduction includes the process of marking a substrate with colorants to form the image from the visual integration of the colorants on the substrate, or to display the image on an image display device.

A tone reproduction curve, or tonal response curve, (TRC) is a plotted curve of measured or estimated tonal responses for a given device. The TRC represents the device's optical outputs at various input values. The TRCs curve shape reflects the non-linear effect of dot gain of a particular printing method. Every printing method has a finite native dot size. The dot itself is not square, nor any other shape that, when stacked perfectly, fills a digitally defined coverage area. Instead, the dot is larger than a perfect square and thus overlaps neighboring dots to a certain extent. The color marking device's TRC is measured or estimated prior to printing color images on the device so that the non-linear effect of dot gain will be compensated for and the output color image print will closely approximate the input source image. Precise control over the tonal reproduction process must be maintained wherever near-exact color image reproduction is desired.

Device calibration is the process of maintaining the device with a fixed known characteristic color response and is a precursor to characterization. Calibration can involve simply ensuring that the ensuring that the controls internal to the target marking device are kept at fixed nominal settings (as is often the case with scanners and digital cameras). Often, if a specific color characteristic is desired, this typically requires making color measurements and deriving correction functions to ensure that the device maintains that desired characteristic. Sometimes the desired characteristic is defined individually for each of the device signals, e.g., for a CRT display, each of the R, G, B channels is often linearized with respect to luminance. This linearization can be implemented with a set of one-dimensional tone reproduction curves (TRCs) for each of the R, G, B signals. Sometimes, the desired characteristic is defined in terms of mixtures of device signals. The most common form of this is gray-balanced calibration, whereby equal amounts of device color signals (e.g., R=G=B or C=M=Y) correspond to device-independent measurements that are neutral or gray (e.g., a*=b*=0 in CIELAB coordinates). Gray-balancing of a device can also be accomplished with a set of TRCs. It is important to keep in mind that calibration with one-dimensional TRCs can control the characteristic response of the device only in a limited region of color space. For example, TRCs that ensure a certain tone response along each of the R, G, B axis do not necessarily ensure control of the gray axis, and vice-versa. However, this limited control should be sufficient to maintain, within reasonable tolerances, a characteristic response within the entire color gamut. A color marking device to be calibrated is referred to as a calibration source. The color space that serves as the standard for the calibration is referred to as the calibration target. To print an image using a given halftone screen, the halftone screen of the target printer must first be calibrated. Calibration sets the threshold values of the halftone screen so that a given input gray level is well represented by the printed image. Calibration must be repeated for every halftone screen of the target device. The calibration will remain valid as long as certain device characteristics do not change.

Halftoning is the process of representing a continuous tone (contone) image by a bi-level image such that, when viewed from a suitable distance, the bi-level image gives the same impression as the contone image. Halftoning reduces the number of quantization levels per pixel in a digital image. A number of halftoning techniques have been developed which are adapted for different applications. Due to their stability and predictability, clustered dot halftoning is one of the primary choices for xerographic printing systems. Halftoning techniques are widely employed in the printing and displaying of digital images and are necessary because the physical processes involved are binary in nature or because the processes being used tend to be restricted to binary operation for reasons of cost, speed, memory, or stability in the presence of process fluctuations. A halftone screen describes the set of values which together make up the set of thresholds to be applied in a halftone screening process to generate the output halftone patterns. A single-center halftone screen uses the entire area for one cell, or tile, only.

Reference is now made to FIG. 1 which illustrates a halftone output pattern from a multi-center (M=4) halftone screen, or a quad-dot screen, with a constant input level. As shown in FIG. 1, two different printed-dot clusters are blended. The ratio between the number of clusters with 8 black pixels and clusters with 9 black pixels is ⅓ in FIG. 1. The overall average color output of the halftone pattern shown in FIG. 1 can be determined by properly "blending" the two tile colors. In general, if a multi-center screen specifies the tiling geometry exactly the same as a corresponding single-cell screen, its halftone outputs are similar to the ones generated by the single-cell screen with various clusters combined by its particular design. As a common approach in screen design, the difference between clusters at any constant level should be as small as possible to avoid or reduce any possible additional visual noise introduced by utilizing multiple centers in one halftone screen. Consequently, at a constant level, the difference between clusters from this kind of screens is usually only one or few pixels. For an extension hereof, consider a multi-center cluster halftone screen with M clusters and maximal N pixels in each cluster. Thus, there are M*N+1 distinguishable halftone dot patterns created by this screen with constant inputs. If all clusters have the same growth, i.e., the shape of clusters with the same number of printed pixels is also the same, there are N+1 halftones (among the M*N+1 dot patterns) with uniform cluster patterns. Such patterns are identical to the dot patterns created by the corresponding single-center cluster halftone screen with the same geometry. Since a multi-center cluster halftone screen specifies a tiling geometry of the halftone geometry the same as the tiling geometry of the halftones of the corresponding single-cell screen, its halftone outputs are similar to those generated by the single-cell halftone screen; except the printed dot clusters are in general not uniform.

Figure 2:
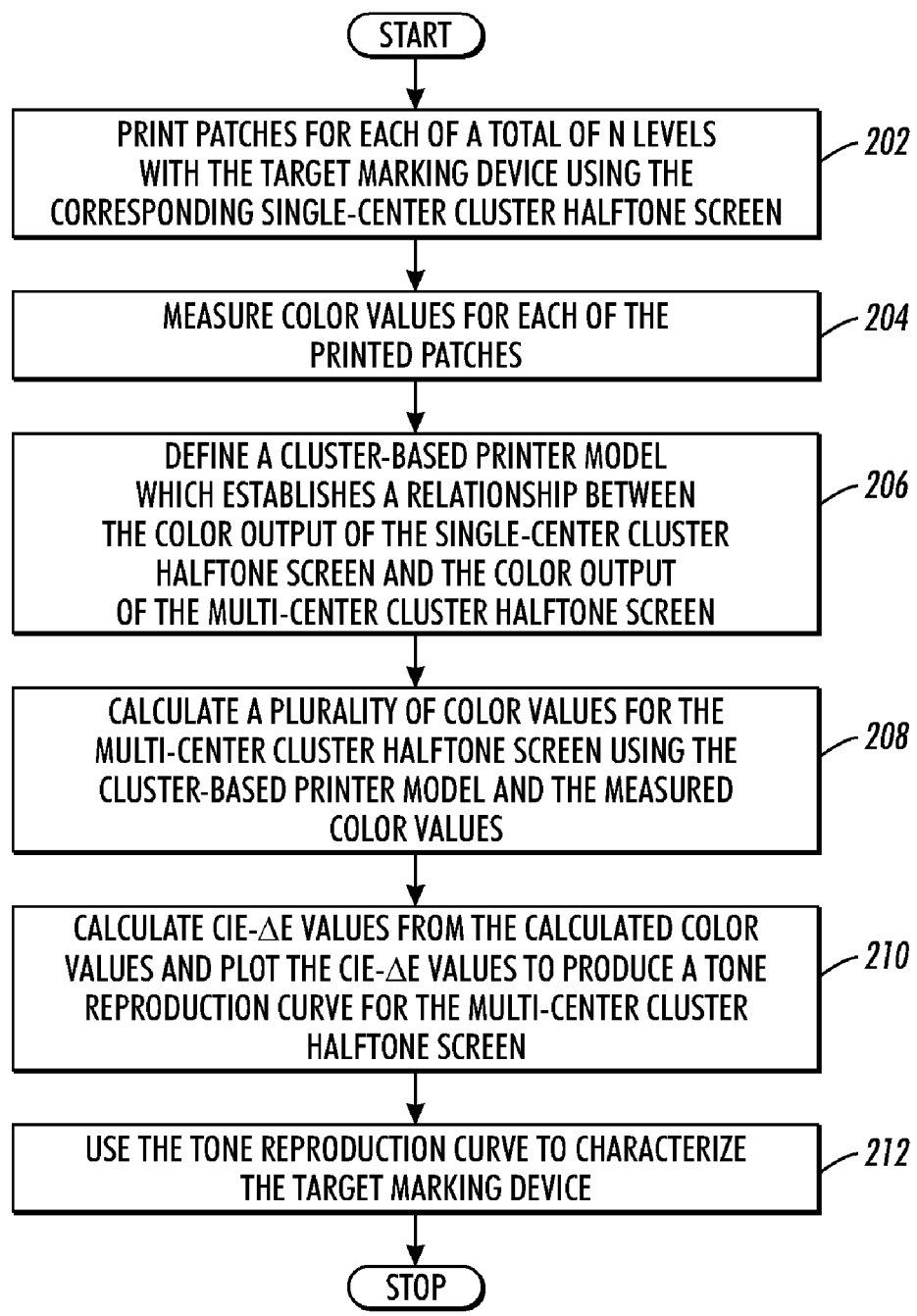
FIG. 2 illustrates an example flow diagram of one embodiment of the present method for generating the complete TRC for a color marking device with a multi-center cluster halftone screen.

Reference is now made to the flow diagram of FIG. 2 which illustrates one example embodiment of the present method for generating the complete TRC for a color marking device with a multi-center cluster halftone screen.

In one example embodiment, at 202, patches are printed for each of a total of N levels using a corresponding single-center cluster halftone screen with the target device. This may also include a design of the layout of the patches that has extra marks to help identify orientation and thus provided information as to the identity of particular patches. Further considerations may include randomization of the patches such that there is no particular dependence of one of the output levels in either the horizontal or vertical direction.

Figure 3:
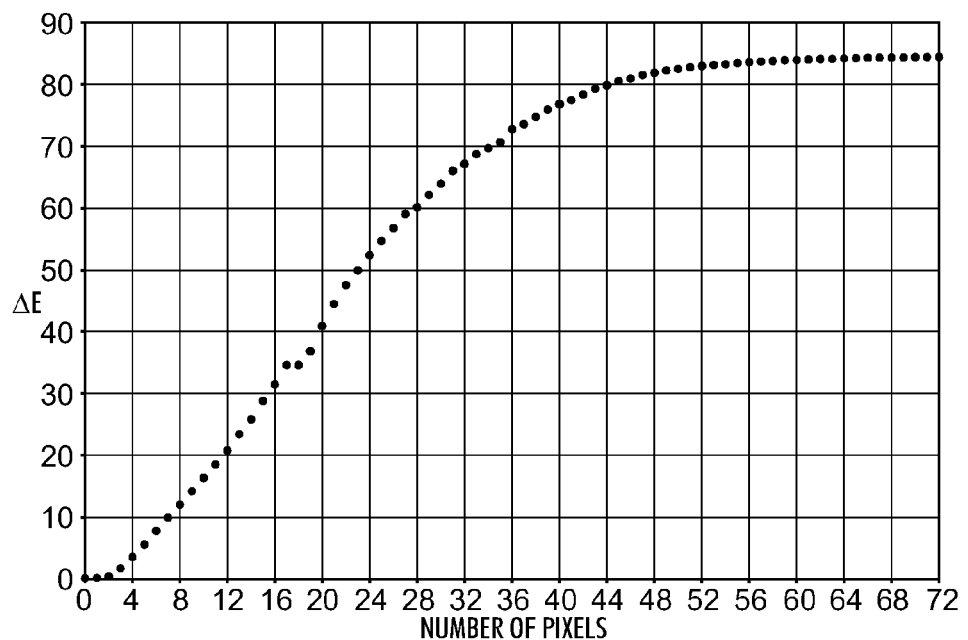
FIG. 3 plots the measured color values of the single-center cluster halftone screen (72 pixels) in accordance with the method hereof.

At 204, color values are measured for each of the printed patches. Color values are measured using color measurement devices known in this art. Such devices include, for example, a calorimeter. FIG. 3 shows the plot of the measured TRC of the single-center cluster halftone screen with 72 pixels.

At 206, a cluster-based printer model is defined for the target marking device. The cluster-based print model, as will be further described herein, establishes a relationship between a color output of the single-center cluster halftone screen and a color output of the multi-center cluster halftone screen. At 208, color values are calculated for the multi-center cluster halftone screen using the cluster-based printer model and the measured color values of the printed patches. The presented cluster-based printer model is a modified Yule-Nielsen Neugebauer model (YNN), Eq. (1), discussed in the background section. Instead of using the fractional toner coverage area (a) in Eq. (1), the present model uses the coverage areas of different types of clusters. The relative coverage area of the $i^{th}$ type of cluster (tiles) is calculated by:

$$a_i = n_i \Big/ \sum_i^N n_i \quad (2)$$

where N is the total number of different types of clusters involved, and $n_i$ is the number of occurrences of the $i^{th}$ type of cluster (tiles).

The present cluster-based printer model is given by:

$$R^{1/\gamma}(\lambda) = \sum_i^N n_i R_i^{1/\gamma}(\lambda) \Big/ \sum_i^N n_i \quad (3)$$

where $R(\lambda)$ is the calculated spectral reflectance for the halftone output of the multi-center halftone screen at wavelength ($\lambda$), N is the total number of different types of clusters (tiles) involved, $n_i$ is the number of occurrences of the $i^{th}$ type of cluster (tiles), and $R_i(\lambda)$ is the spectral reflectance of the $i^{th}$ type of cluster measured from a printed halftone pattern generated using the corresponding single-center cluster halftone screen. The fitting parameter $\gamma$ in Eq. (3) depends on the amount of light diffusion in the paper and can be determined experimentally.

In the case when N=2, or where there are only two different types of clusters at a given constant input level, Eq. (3), can be rewritten as:

$$[R_1(\lambda)+(R(\lambda)-R_1(\lambda))]^{1/\gamma}=(n_1 \cdot [R_1(\lambda)]^{1/\gamma}+n_2 \cdot [R_1(\lambda)+(R_2(\lambda)-R_1(\lambda))]^{1/\gamma})/(n_1+n_2).$$

This reduces to:

$$[1 + (R(\lambda) - R_1(\lambda))/R_1(\lambda)]^{1/\gamma} = \quad (4)$$
$$\frac{n_1}{n_1 + n_2} + \frac{n_2}{n_1 + n_2}[1 + (R_2(\lambda) - R_1(\lambda))/R_1(\lambda)]^{1/\gamma}$$

Since the reflectance difference, $R_2(\lambda)-R_1(\lambda)$, as well as $R(\lambda)-R_1(\lambda)$, is usually much smaller than $R_1(\lambda)$, taking the Taylor series expansion for both sides of Eq. (4) and using only the first non-trivial term of the expansion, Eq. (4) reduces to the following approximation:

$$1 + 1/\gamma \cdot \frac{(R(\lambda) - R_1(\lambda))}{R_1(\lambda)} = 1 + 1/\gamma \cdot \left(\frac{n_2}{n_1 + n_2}\right)\frac{(R_2(\lambda) - R_1(\lambda))}{R_1(\lambda)}.$$

This can be reduced to:

$$R(\lambda) = \frac{n_1}{n_1 + n_2} R_1(\lambda) + \frac{n_2}{n_1 + n_2} R_2. \quad (5)$$

Thus, for two kinds of clusters with similar structures and small differences in reflectance, the average reflectance is a linear combination of the two reflectances where the coefficients of the linear combination are the counts of each kind of cluster. The fitting parameter $\gamma$ in Eq. (3) does not affect this result.

Since Eq. (5) is true for all wavelengths, and since CIE XYZ color measurements can be defined as linear combinations of the full reflectance spectrum, an average color output can be given by:

$$X = \frac{n_1}{n_1 + n_2} X_1 + \frac{n_2}{n_1 + n_2} X_2 \quad (6)$$

where $X_1$ and $X_2$ are the CIE X (Y or Z) color values of the two halftones with uniform-clusters, respectively, and X is the calculated average CIE X (Y or Z) value of the two clusters.

Using a similar argument for Eq. (5), it is apparent that Eq. (6) can be applied to $\Delta E$ measured in the CIE Lab space, so long as the same assumption about the small differences between the two kinds of clusters, as discussed above, for Eq. (5) remains. As a result, the average color output X in Eq. (6) can be any of a CIE XYZ or $\Delta E$ value measured in the CIE Lab space.

The above discussion on Eqs. (4)-(6) can be extended to cases when N, the total number of different types of clusters (tiles) involved, is small. Therefore, the presented cluster-based printer model can be alternatively given by:

$$X = \sum_i^N n_i X_i \Big/ \sum_i^N n_i \quad (7)$$

where X and $X_i$ are defined as any of a CIE XYZ or $\Delta E$ value measured in the CIE Lab space. X is the calculated output of the multi-center halftone screen and $X_i$ is the measured output of the $i^{th}$ type of cluster (tiles) from a printed halftone pattern generated using the corresponding single-center cluster halftone screen. N is the total number of different types of clusters (tiles) involved, and $n_i$ is the number of occurrences of the $i^{th}$ type of cluster (tiles).

At 210, CIE $\Delta E$ values are calculated from the color values produced by the present cluster-based printer model. Algorithms for generating such values are well known. The calculated $\Delta E$ values are plotted against the number of pixels. The plotted values produce the complete tone reproduction curve for the multi-center cluster halftone screen of the target color marking device. It should be appreciated that the generated values can be further stored in a lookup table (LUT) or stored in memory. The specific implementation of the values generated by the present cluster-based printer model will depend on the objectives of the end user hereof.

Figure 4:
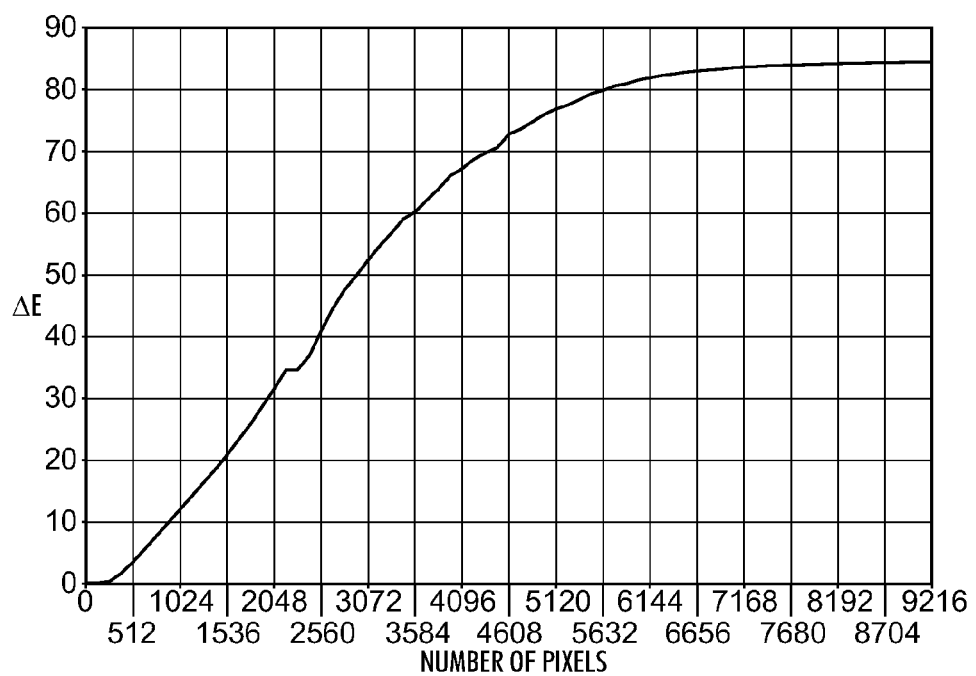
FIG. 4 plots the color values generated using the present cluster-based printer model for the complete TRC of a multi-center cluster halftone screen with 128 centers.

FIG. 4 shows the complete TRC of a halftone screen (with 128 centers) generated using the present cluster-based printer model. Note that the TRC of FIG. 4 has a similar geometry to the corresponding single-center cluster halftone screen. Both TRCs were plotted as calculated CIE ΔE against the number of printed pixels.

At 212, the target marking device can then be characterized using the produced complete tone reproduction curve. One of ordinary skill in this art would appreciate that device characterization is a process used to derive the relationship between device-dependent and device-independent color representations for the calibrated device. Since device characterization depends on the specific device and the objectives intended to be achieved, a further discussion as to a specific device characterization has been omitted. In typical color management workflows, device characterization is done infrequently while the much simpler device calibration process is carried out relatively frequently to compensate for temporal changes in the color marking device's color response and to maintain the device in a fixed known state. It is assumed that a calibrated device maintains the validity of the characterization function. Calibration and characterization form a pair of processes. If a new calibration alters the characteristic color response of the device, the characterization for the device must be re-derived. Calibration is like characterization, except that it includes the adjustment of the target device, as opposed to just the measurement of the device in order to describe the behavior of the device in relation to a color space.

Methods of device calibration using a TRC are well known in this art. Thus, a further discussion as to a calibration process for a specific device has also been omitted. Device calibration may include a set of color shift correction signals intended to compensate for changes in the color reproduction properties of the target marking device. The set of color shift correction signals may be determined using the TRCs to correct for a nonlinear response of the image output device due to wear, ink supply changes, etc.

In one embodiment, a computer workstation or a color management system is used to implement various embodiments of the present method. Such a system would be capable of executing various embodiments hereof and generating the complete TRC for a color marking device with a multi-center cluster halftone screen. Such a system may further be capable of performing one or more steps of a device characterization or a device calibration using the generated complete TRC.

The workstation or color management system includes a special purpose computer which may be placed in communication with one or more measurement devices such as, for example, a colorimeter or spectrometer or other measuring devices known in the art capable of obtaining some or all of the above-described color measurement values from a printed patch or a color signal. Such a special purpose computer includes a processor capable of processing machine executable program instructions loaded from a computer program product. The processor is in communication with a bus and a memory for storing machine instructions. Main memory includes a program memory capable of storing data in a buffer readable by the processor. The system also includes a secondary memory such as a hard disk drive and/or a removable storage drive which reads and writes to a removable storage unit such as a floppy disk, magnetic tape, optical disk, etc., that stores computer software instructions and data. The secondary memory also includes other mechanisms for allowing a computer readable medium containing program instructions to be loaded onto the system and read through a communications interface. Such an interface allows software and data to be transferred between the processor and one or more external devices. Example communication interfaces include, for example, a modem, a network card, a communications port, a PCMCIA slot and card, and other devices capable of transmitting and/or receiving digitized data. Computer programs can also be received via the communications interface. Software, data, and computer programs transferred and/or received via the communications interface may be in the form of signals such as, for example, electronic, electromagnetic, optical, or any other signals capable of being received by communications interface. These signals are provided to the communications interface via a communications path which carries such signals. The communications channel path may be implemented using wire, cable, fiber optic, phone line, cellular link, RF, or other communications channels. The system also includes a display device such as a CRT or LCD and may further include any of a plurality of input devices such as a keyboard, mouse, keypad, touch screen, and the like, for accepting an input from a user/operator.

Figure 5:
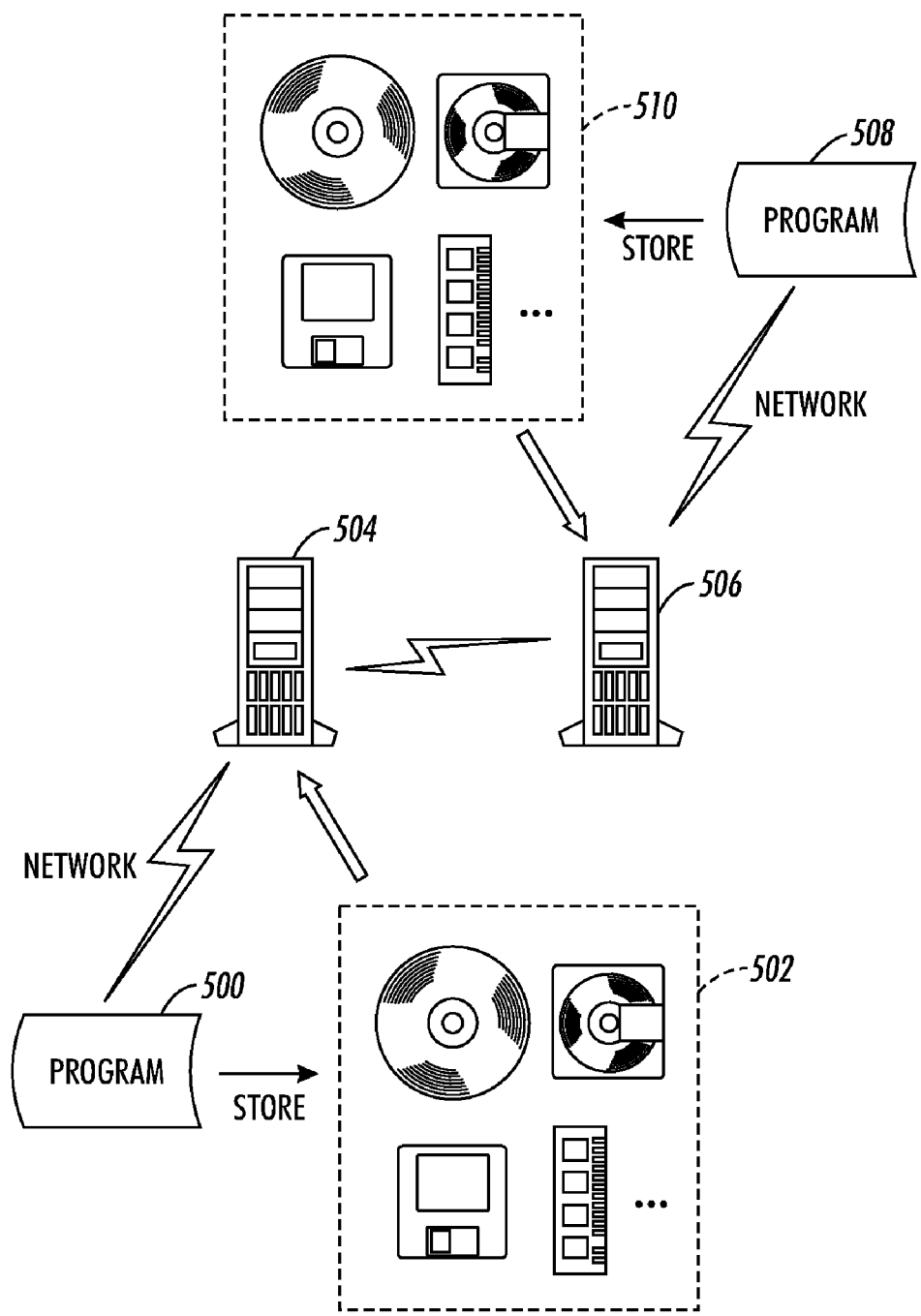
FIG. 5 is an explanatory diagram illustrating one example of a computer readable storage medium capable of storing machine readable instructions which, when mounted on a computer or a special purpose computer system, causes the system to perform one or more aspects of the present method as described above.

Reference is now being made to FIG. 5 which is an explanatory diagram illustrating one example of a computer readable storage medium capable of storing machine readable instructions which, when mounted on a computer or a special purpose computer system, causes the system to perform one or more aspects of the present method as described above. The machine readable instructions may be modified by one computer and transferred to another computer. In the illustrated embodiment, one or more computer program 500 for carrying out the present method are loaded on a computer-readable storage media 502 which includes media such as optical disks (CD-ROM etc.), magnetic disks, magnetic cards, memories (including IC cards and memory card). The storage media stores the machine readable program instructions for sale, transport, and storage by changing magnetic, optical, and/or electric energy states in response to program description instructions having been transferred to the media. The storage medium can then be mounted on computer system 504 and transferred or otherwise communicated to computer system 506. The program instructions can then be off-loaded to another program 508, in original form or modified, including data, and stored on storage media 510. Both of the computer systems include processors capable of executing machine readable program instructions for carrying out one or more steps of the present method as illustrated in the flow diagram of FIG. 2.

Terms such as, computer program medium, computer readable medium, computer executable medium, and computer usable medium are used herein to generally refer to a machine readable media such as main memory, secondary memory, removable storage device such as a hard disk, and communication signals. Such computer program products are means for providing instructions and/or data to the computer system or device for implementing the present method. The computer readable medium stores data, instructions, messages packets, or other machine readable information. The computer readable medium may include non-volatile memory, such as a floppy disk, hard drive, memory, ROM, RAM, flash memory, disk memory, and other permanent storage useful, for example, for transporting information such as data and machine readable program instructions. It may further include a CD-ROM, DVD, tape, cassette, or other digital or analog media, capable of having embodied thereon one or more logical programming instructions or other machine executable codes or commands that implement and facilitate the function, capability, and methods disclosed herein. The computer readable medium may additionally comprise information in a transitory state medium such as a network link or a network interface which may include a wired network or a wireless network which allows a computer to read such computer readable information.

It should be understood that the flow diagram hereof are intended to be illustrative. Other operations, for example, may be added, modified, enhanced, condensed, integrated, or consolidated. Variations thereof are intended to fall within the scope of the appended claims.

It should also be understood that one or more aspects of the present method are intended to be incorporated in an article of manufacture, including one or more computer program products. The article of manufacture may be included on at least one storage device readable by a machine architecture, xerographic, color management, or other image processing system capable of executing program instructions. The article of manufacture may be included as part of a xerographic system, color management system, an operating system, a software program, a plug-in. Such an article of manufacture may further be shipped, sold, leased, or otherwise provided separately either alone or as part of an add-on, update, upgrade, or product suite by the present assignee or a licensee thereof.

It will be appreciated that the above-disclosed features and functions and variations thereof may be desirably combined into many other different systems or applications. Various presently unforeseen or un-anticipated alternatives, modifications, variations, or improvements may become apparent and/or subsequently made by those skilled in the art which are also intended to be encompassed by the appended claims. The embodiments set forth above are considered to be illustrative and not limiting. Various changes to the above-described embodiments may be made without departing from the spirit and scope of the invention.

What is claimed is:

1. A method for generating a tone reproduction curve for a target marking device equipped with a multi-center cluster halftone screen having a similar tiling geometry and halftone dot growth as a corresponding single-center cluster halftone screen, the method comprising:

printing a patch for each of a total N levels using a corresponding single-center cluster halftone screen with a target color marking device;
  measuring color values for each of said printed patches;
  defining a cluster-based printer model for said target marking device which establishes a relationship between a color output of said single-center cluster halftone screen and a color output of a multi-center cluster halftone screen of said target marking device, said cluster-based printer model comprising:

$$X = \sum_{i}^{N} n_i X_i \Big/ \sum_{i}^{N} n_i,$$

where N is a total number of different types of clusters, $n_i$ is a number of occurrences of an $i^{th}$ type of cluster, X is a calculated color value for said multi-center cluster halftone screen $X_i$ is said measured color value being any of: a spectral reflectance, CIE XYZ, and a CIE $\Delta E$ of an $i^{th}$ cluster of said single-center cluster halftone screen;
  calculating color values for said multi-center cluster halftone screen using said cluster-based printer model and said measured color values;
  producing a tone reproduction curve from said calculated color values; and
  characterizing said target color marking device using said produced tone reproduction curve.

2. The method of claim 1, wherein producing a tone reproduction curve from said calculated color values further comprises calculating CIE $\Delta E$ values from said calculated color values and producing said tone reproduction curve from said calculated $\Delta E$ values.

3. The method of claim 1, wherein characterizing said target marking device comprises any of a device characterization and a device calibration.

4. The method of claim 3, wherein said device calibration comprises adjusting at least one threshold level of said multi-center cluster halftone screen using said produced tone reproduction curve.

5. A system for generating a tone reproduction curve for a target marking device equipped with a multi-center cluster halftone screen having a similar tiling geometry and halftone dot growth as a corresponding single-center cluster halftone screen, the system comprising:

a storage medium capable of storing data; and
  a processor in communication with said storage medium, said processor capable of executing a machine readable instruction for performing the method of:
    printing a patch for each of a total N levels using a corresponding single-center cluster halftone screen with a target color marking device;
    measuring color values for each of said printed patches;
    defining a cluster-based printer model for said target marking device which establishes a relationship between a color output of said single-center cluster halftone screen and a color output of a multi-center cluster halftone screen of said target marking device, said cluster-based printer model comprising:

$$X = \sum_{i}^{N} n_i X_i \Big/ \sum_{i}^{N} n_i,$$

where N is a total number of different types of clusters, $n_i$ is a number of occurrences of an $i^{th}$ type of cluster, X is a calculated color value for said multi-center cluster halftone screen $X_i$ is said measured color value being any of: a spectral reflectance, CIE XYZ, and a CIE $\Delta E$ of an $i^{th}$ cluster of said single-center cluster halftone screen;
    calculating color values for said multi-center cluster halftone screen using said cluster-based printer model and said measured color values;
    producing a tone reproduction curve from said calculated color values; and
    characterizing said target color marking device using said produced tone reproduction curve.

6. The system of claim 5, wherein producing a tone reproduction curve from said calculated color values further comprises calculating CIE $\Delta E$ values from said calculated color values and producing said tone reproduction curve from said calculated $\Delta E$ values.

7. The system of claim 5, wherein characterizing said target marking device comprises any of a device characterization and a device calibration.

8. The system of claim 7, wherein said device calibration comprises adjusting at least one threshold level of said multi-center cluster halftone screen using said produced tone reproduction curve.

9. A method for generating a tone reproduction curve for a target marking device equipped with a multi-center cluster halftone screen having a similar tiling geometry and halftone dot growth as a corresponding single-center cluster halftone screen, the method comprising:

printing a patch for each of a total N levels using a corresponding single-center cluster halftone screen with a target color marking device;

measuring color values for each of said printed patches;

defining a cluster-based printer model for said target marking device which establishes a relationship between a color output of said single-center cluster halftone screen and a color output of a multi-center cluster halftone screen of said target marking device, wherein said cluster-based printer model comprises:

$$R^{1/\gamma}(\lambda) = \sum_i^N n_i R_i^{1/\gamma}(\lambda) \Big/ \sum_i^N n_i,$$

where N is a total number of different types of clusters, $n_i$ is a number of occurrences of an $i^{th}$ type of cluster, $\gamma$ is a parameter which depends on an amount of light diffusion in the paper, $R_i(\lambda)$ is a measured spectral reflectance at wavelength $\lambda$ of the $i^{th}$ type of cluster of said single-center cluster halftone screen and $R(\lambda)$ is a calculated spectral reflectance at wavelength $\lambda$ for said multi-center cluster halftone screen;

calculating color values for said multi-center cluster halftone screen using said cluster-based printer model and said measured color values;

producing a tone reproduction curve from said calculated color values; and characterizing said target color marking device using said produced tone reproduction curve.

10. The method of claim 9, further comprising calculating other color values for said multi-center cluster halftone screen using said calculated spectral reflectances, said other color values being any of: a CIE XYZ, a CIE L*a*b*, and a CIE ΔE.

11. The method of claim 9, wherein producing a tone reproduction curve from said calculated color values further comprises calculating CIE ΔE values from said calculated color values and producing said tone reproduction curve from said calculated ΔE values.

12. The method of claim 9, wherein characterizing said target marking device comprises any of a device characterization and a device calibration.

* * * * *